United States Patent
Afergan et al.

(10) Patent No.: US 7,395,355 B2
(45) Date of Patent: Jul. 1, 2008

(54) METHOD FOR CACHING AND DELIVERY OF COMPRESSED CONTENT IN A CONTENT DELIVERY NETWORK

(75) Inventors: Michael M. Afergan, Cambridge, MA (US); Charisma Schlossberg, Watertown, MA (US); Duke P. Hong, Oceanside, CA (US); Satish Balusu Rao, Berkeley, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 689 days.

(21) Appl. No.: 10/194,043

(22) Filed: Jul. 11, 2002

(65) Prior Publication Data

US 2004/0010621 A1    Jan. 15, 2004

(51) Int. Cl.
  *G06F 15/16* (2006.01)
(52) U.S. Cl. .................. 709/247; 709/231; 709/232
(58) Field of Classification Search ............. 709/247, 709/219, 232, 217, 203, 225, 231
  See application file for complete search history.

(56) References Cited

U.S. PATENT DOCUMENTS

| | | | | |
|---|---|---|---|---|
| 5,852,717 A | * | 12/1998 | Bhide et al. | ............. 709/203 |
| 5,949,551 A | * | 9/1999 | Miller et al. | ............. 358/408 |
| 5,978,841 A | * | 11/1999 | Berger | .............. 709/217 |
| 5,991,809 A | | 11/1999 | Kriegsman | |
| 6,003,030 A | | 12/1999 | Kenner et al. | |
| 6,003,082 A | * | 12/1999 | Gampper et al. | ........ 709/225 |
| 6,029,175 A | | 2/2000 | Chow et al. | |
| 6,108,703 A | | 8/2000 | Leighton et al. | |
| 6,119,143 A | | 9/2000 | Dias et al. | |
| 6,185,598 B1 | | 2/2001 | Farber et al. | |
| 6,405,252 B1 | | 6/2002 | Gupta et al. | |
| 6,460,076 B1 | * | 10/2002 | Srinivasan | ............. 709/219 |
| 6,484,143 B1 | | 11/2002 | Swildens et al. | |
| 6,502,125 B1 | | 12/2002 | Kenner et al. | |
| 6,542,508 B1 | * | 4/2003 | Lin | ................ 370/395.43 |
| 6,553,413 B1 | * | 4/2003 | Leighton et al. | ....... 709/219 |
| 6,665,706 B2 | | 12/2003 | Kenner et al. | |
| 6,751,673 B2 | * | 6/2004 | Shaw | ................ 709/231 |
| 6,820,133 B1 | | 11/2004 | Grove et al. | |
| 7,133,905 B2 | | 11/2006 | Dilley et al. | |
| 7,200,681 B1 | | 4/2007 | Lewin et al. | |
| 7,240,100 B1 | | 7/2007 | Wein et al. | |
| 2002/0059463 A1 | * | 5/2002 | Goldstein | ............. 709/247 |
| 2002/0091801 A1 | * | 7/2002 | Lewin et al. | ............ 709/219 |
| 2002/0138437 A1 | * | 9/2002 | Lewin et al. | .............. 705/51 |
| 2002/0152318 A1 | * | 10/2002 | Menon et al. | ........... 709/231 |
| 2003/0065810 A1 | * | 4/2003 | Ims et al. | .............. 709/232 |

* cited by examiner

*Primary Examiner*—Saleh Najjar
*Assistant Examiner*—V. Korobov
(74) *Attorney, Agent, or Firm*—David H. Judson

(57) ABSTRACT

A content delivery network (CDN) edge server is provisioned to provide last mile acceleration of content to requesting end users. The CDN edge server fetches, compresses and caches content obtained from a content provider origin server, and serves that content in compressed form in response to receipt of an end user request for that content. It also provides "on-the-fly" compression of otherwise uncompressed content as such content is retrieved from cache and is delivered in response to receipt of an end user request for such content. A preferred compression routine is gzip, as most end user browsers support the capability to decompress files that are received in this format. The compression functionality preferably is enabled on the edge server using customer-specific metadata tags.

12 Claims, 3 Drawing Sheets

METHOD FOR CACHING AND DELIVERY OF COMPRESSED CONTENT IN A CONTENT DELIVERY NETWORK

BACKGROUND OF THE INVENTION

This application contains subject matter protected by copyright.

1. Technical Field

The present invention relates generally to techniques for selectively storing content in a compressed form in a content delivery network edge server cache and for serving the content to an end user browser.

2. Description of the Related Art

A content delivery network ("CDN") is a collection of content servers and associated control mechanisms that off-load work from Web site origin servers by delivering content on their behalf to end users. A well-managed CDN achieves this goal by serving some or all of the contents of a site's Web pages, thereby reducing the customer's costs while enhancing an end user's browsing experience from the site. In operation, the CDN uses a request routing mechanism to locate a CDN content server close to the client to serve each request directed to the CDN, where the notion of "close" is based, in part, on evaluating results of network traffic tests.

"Data compression techniques are well-known in the art. In HTTP 1.1, a Web server may compress an object, e.g., the HTML comprising a base page, to reduce the download time of the page from the server to a requesting end user browser. Most browsers in use today are capable of receiving compressed content and decompressing such content for display. A recent study showed that over 95% of users have browsers capable of decoding compressed HTMLs. A browser indicates to a Web server that it can receive compressed content in the HTTP request header. The Web server may send compressed content, indicating in the HTTP response header that the object was compressed and should be uncompressed before rendering. Servers should not send compressed HTMLs to browsers that do not include decompression capability in the request header. The benefit of compressing data in a typical HTTP 1.1 client-server session is described in a W3C Note titled *Network Performance Effects of HTTP/1.1, CSS1, and PNG*, by Neilsen et al., June 1997".

While browsers have had the capability to decompress content for years, most servers do not for various reasons, primarily due to issues involving compatibility, processor workload and complexity of content management.

While content delivery network service providers (CDNSPs) have developed and implemented techniques for accelerating delivery of content between origin server sites and the CDN edge servers, delivery over the so-called "last mile" (from the ISP at which the edge server is located to the end user) has not been adequately addressed.

It would be highly desirable to accelerate the delivery of content between a CDN edge server and the requesting end user browser through selective delivery of compressed content.

BRIEF SUMMARY OF THE INVENTION

A technical advantage is provided by selectively compressing given content provider content as it is received (from an origin server) for caching at a CDN edge server, and/or selectively delivering given content in a compressed format from the edge server to a requesting end user browser. These techniques provide for effective last mile acceleration of content delivery in a CDN. Preferably, the edge server utilizes a publicly available compression utility such as gzip (GNU zip), although any convenient utility may be used. In one embodiment, the edge server has a first routine running on its forward side, i.e., the side that connects the edge server to one or more content provider origin servers. The first routine receives uncompressed content from a content provider origin server and selectively compresses that content to make more efficient use of the edge server's cache space. A second routine runs on the server's client side, i.e., the side that connects the edge server to requesting end user browsers. The second routine compresses content that has been cached in an uncompressed form so that such content can be delivered by the edge server (in such format) to the requesting end user browser. According to a technical advantage of the invention, preferably the routines are selectively controlled by customer-specific metadata supplied to the edge server.

In a preferred embodiment, compression metadata is defined for given compressible file types. A first metadata tag controls the edge server to take uncompressed content from an origin server and to apply the first routine to compress the content, thereby allowing the edge server to make more efficient use of its cache space. When a request for such content is received at the edge server, it is typically served as-is, namely, in the same compressed form in which it was cached. A second metadata tag controls the edge server to simply cache content in its uncompressed form (if cacheable) and, using the second routine, to compress the content when a request for compressed content is received at the edge server. Preferably the first and second routines are gzip. Because the majority of browsers in use today support gzipped content, content associated with the first or second metadata tags is delivered to the end user in a compressed form to provide last mile accelerated delivery.

Preferably, compression metadata is applied to compressible file types, e.g., those with a MIME type such as HTML, cascading style sheets, and the like. The benefits of compression for such content are significant. Typically, page sizes are reduced to roughly ¼-th of their original sizes, significantly reducing the transfer time to the end user.

The present invention provides an improved CDN edge server that fetches, compresses and caches content obtained from a content provider origin server, and/or compresses content on-the-fly as it is being delivered. These features preferably are enabled using simple metadata as applied to specified files, directories, host names or any other constraints.

The foregoing has outlined some of the more pertinent features of the present invention. These features should be construed to be merely illustrative. Many other beneficial results can be attained by applying the disclosed invention in a different manner or by modifying the invention as will be described.

DETAILED DESCRIPTION OF THE PREFERRED EMBODIMENT

By way of background, it is known in the prior art to deliver digital content (e.g., HTTP content, streaming media and applications) using an Internet content delivery network (CDN). A CDN is a network of geographically-distributed content delivery nodes that are arranged for efficient delivery of content on behalf of third party content providers. Typically, a CDN is implemented as a combination of a content delivery infrastructure, a request-routing mechanism, and a distribution infrastructure. The content delivery infrastructure usually comprises a set of "surrogate" origin servers that are located at strategic locations (e.g., Internet network access points, Internet Points of Presence, and the like) for delivering content to requesting end users. The request-routing mechanism allocates servers in the content delivery infrastructure to requesting clients in a way that, for web content delivery, minimizes a given client's response time and, for streaming media delivery, provides for the highest quality. The distribution infrastructure consists of on-demand or push-based mechanisms that move content from the origin server to the surrogates. An effective CDN serves frequently-accessed content from a surrogate that is optimal for a given requesting client. In a typical CDN, a single service provider operates the request-routers, the surrogates, and the content distributors. In addition, that service provider establishes business relationships with content publishers and acts on behalf of their origin server sites to provide a distributed delivery system.

Figure 1:
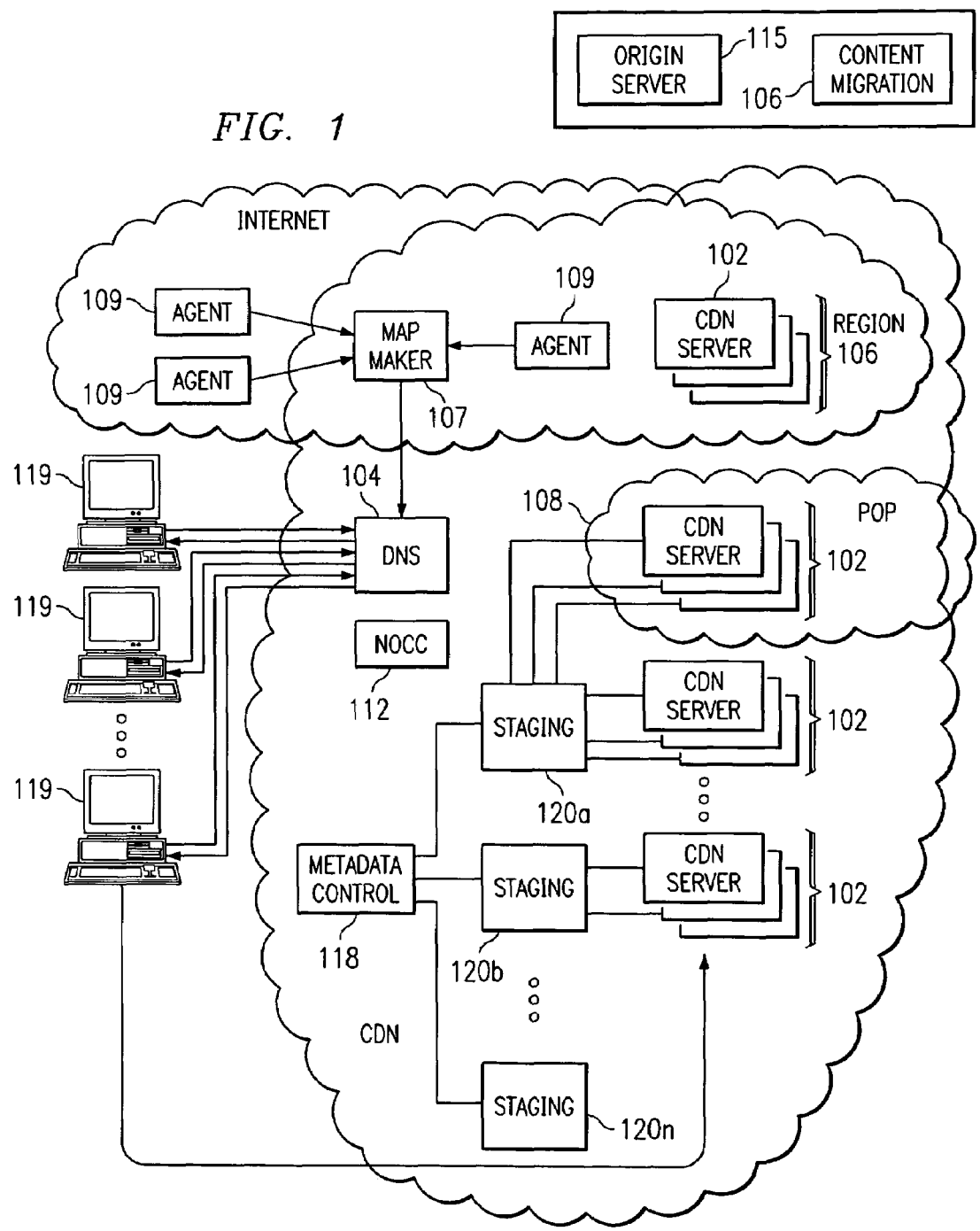
FIG. 1 is a block diagram of a known content delivery network in which the present invention may be implemented.

As seen in FIG. 1, an Internet content delivery infrastructure usually comprises a set of "surrogate" origin servers 102 that are located at strategic locations (e.g., Internet network access points, and the like) for delivering copies of content to requesting end users 119. A surrogate origin server is defined, for example, in IETF Internet Draft titled "Requirements for Surrogates in the HTTP" dated Aug. 9, 2000, which is incorporated herein by reference. The request-routing mechanism 104 allocates servers 102 in the content delivery infrastructure to requesting clients. The distribution infrastructure consists of on-demand or push-based mechanisms that move content from the origin server to the surrogates. A CDN service provider (CDNSP) may organize sets of surrogate origin servers as a group or so-called "region." In this type of arrangement, a CDN region 106 typically comprises a set of one or more content servers that share a common back-end network, e.g., a LAN, and that are located at or near an Internet access point. Thus, for example, a typical CDN region may be co-located within an Internet Service Provider (ISP) Point of Presence (PoP) 108. A representative CDN content server is a Pentium-based caching appliance running an operating system (e.g., Linux, Windows NT, Windows 2000) and having suitable RAM and disk storage for CDN applications and content delivery network content (e.g., HTTP content, streaming media and applications). Such content servers are sometimes referred to as "edge" servers as they are located at or near the so-called outer reach or "edge" of the Internet. The CDN typically also includes network agents 109 that monitor the network as well as the server loads. These network agents are typically co-located at third party data centers or other locations. Mapmaker software 107 receives data generated from the network agents and periodically creates maps that dynamically associate IP addresses (e.g., the IP addresses of client-side local name servers) with the CDN regions.

Content may be identified for delivery from the CDN using a content migrator or rewrite tool 106 operated, for example, at a participating content provider server. Tool 106 rewrites embedded object URLs to point to the CDNSP domain. A request for such content is resolved through a CDNSP-managed DNS to identify a "best" region, and then to identify an edge server within the region that is not overloaded and that is likely to host the requested content. Instead of using content provider-side migration (e.g., using the tool 106), a participating content provider may simply direct the CDNSP to serve an entire domain (or subdomain) by a DNS directive (e.g., a CNAME). In either case, the CDNSP may provide object-specific metadata to the CDN content servers to determine how the CDN content servers will handle a request for an object being served by the CDN. Metadata, as used herein, refers to a set of control options and parameters for the object (e.g., coherence information, origin server identity information, load balancing information, customer code, other control codes, etc.), and such information may be provided to the CDN content servers via a configuration file, in HTTP headers, or in other ways. The Uniform Resource Locator (URL) of an object that is served from the CDN in this manner does not need to be modified by the content provider. When a request for the object is made, for example, by having an end user navigate to a site and select the URL, a customer's DNS system directs the name query (for whatever domain is in the URL) to the CDNSP DNS request routing mechanism. Once an edge server is identified, the browser passes the object request to the server, which applies the metadata supplied from a configuration file or HTTP response headers to determine how the object will be handled.

As also seen in FIG. 1, the CDNSP may operate a metadata transmission system 116 comprising a set of one or more servers to enable metadata to be provided to the CDNSP content servers. The system 116 may comprise at least one control server 118, and one or more staging servers 120a-n, each of which is typically an HTTP server (e.g., Apache). Metadata is provided to the control server 118 by the CDNSP or the content provider (e.g., using a secure extranet application) and periodically delivered to the staging servers 120a-n. The staging servers deliver the metadata to the CDN content servers as necessary.

Figure 2:
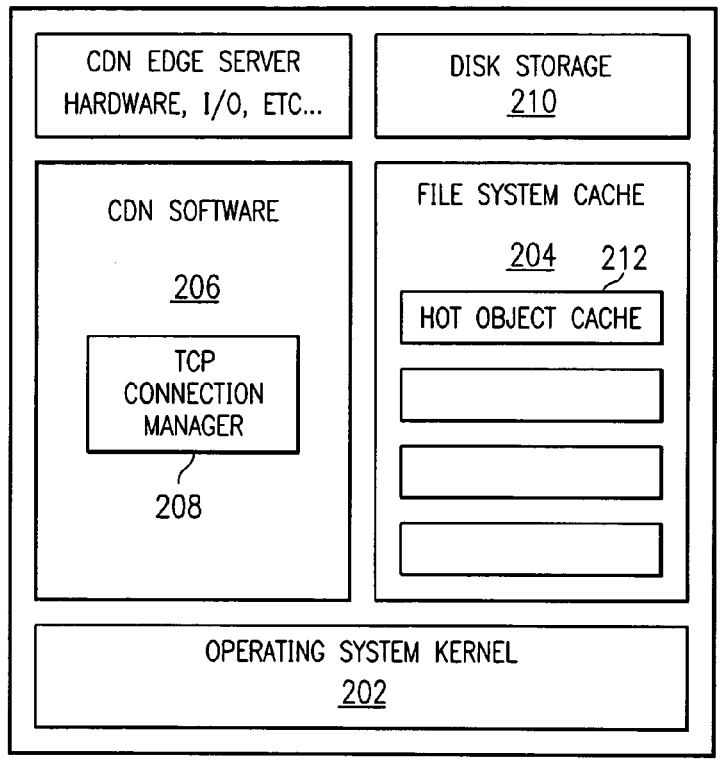
FIG. 2 illustrates a typical machine configuration for a CDN edge server.

FIG. 2 illustrates a typical machine configuration for a CDN content edge server. Typically, the content server 200 is a caching appliance running an operating system kernel 202, a file system cache 204, CDN software 206, TCP connection manager 208, and disk storage 210. CDN software 206 creates and manages a "hot" object cache 212 for popular objects being served by the CDN. It may also provide other CDN-related functions, such as request routing, in-region load balancing, and the like. In operation as an HTTP cache for example, the content server 200 receives end user requests for content, determines whether the requested object is present in the hot object cache or the disk storage, serves the requested object via HTTP (if it is present) or establishes a connection to another content server or an origin server to attempt to retrieve the requested object upon a cache miss. Typically, the edge server operates in a "pull" manner, wherein an object is pulled into the cache initially upon the first request to the cache—which will generate a cache miss since the object is not present.

The edge server includes a forward or "server" side, for handling communications between the edge server and the content provider origin servers, and a client side, for handling communications between the end user browsers and the edge server. An illustrative architecture of this type is shown in the paper titled "Intelligent Caching For World-Wide Web Objects," Wessels, Proceedings of the INET '95 Conference 1995.

Figure 3:
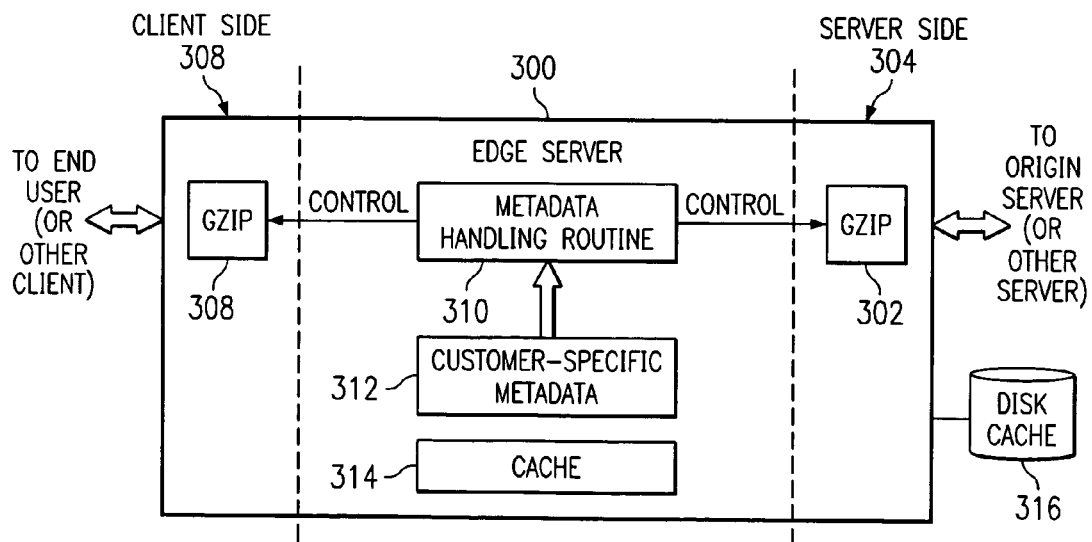
FIG. 3 illustrates a CDN edge server that has been modified according to the present invention to include a first compression utility on its forward side, and a second compression utility on its client side, with these utilities being selectively controlled by customer-specific metadata.

FIG. 3 illustrates a CDN edge server 300 according to the present invention. This server has been modified to include a first compression utility 302 on its forward side 304, and a second compression utility 306 on its client side 308. Each compression utility is preferably gzip, which is an open source compression routine that provides high performance and that is compatible with most existing end user browsers. Edge server 300 also includes a metadata handling routine 310 for applying customer-specific metadata 312 to control application of the first and second compression routines 302 and 306. According to an illustrative embodiment, a first metadata tag, e.g., gzip-incoming, is applied, selectively, to (uncompressed) content fetched by the edge server from an origin server, and a second metadata tag, e.g., gzip-ghost-to-browser, is applied, selectively, to (uncompressed) content fetched by the edge server from its own in-memory cache 314 or disk cache 316. Generally, the first metadata tag is associated with content that, upon receipt from the origin server, is desired to be stored in a compressed form. Such content, typically, will be delivered to a requesting end user as-is, in the sense that the cached content is merely retrieved and sent to the end user in its already-compressed state. In contrast, the second metadata tag normally is associated with content that, upon receipt from the origin server, has not been stored in a compressed form but where it is desired to take advantage of last mile acceleration between the edge server and the requesting end user. Preferably, when the second tag is set, the content associated therewith is compressed as it being served in response to an end user request, i.e., "on-the-fly."

Both the first and second metadata tags cause the edge server to take uncompressed content and serve it to browsers, either compressed or uncompressed, depending on whether they advertise support for compressed content.

"Typically, the first metadata tag is used for objects that have cache time-to-live (TTL) greater than zero and that are not associated with edge side include (ESI) processing. ESI is a simple markup language to describe cacheable and non-cacheable Web page components that can be aggregated, assembled and delivered at the network edge. Using ESI tags, developers can identify content fragments for dynamic assembly at the edge server. ESI also specifies a content invalidation protocol for transparent content management across ESI-compliant solutions, such as application servers and content delivery networks. The ability to assemble dynamic pages from individual page fragments means that only non-cacheable or expired fragments need to be fetched from the origin Web site, thereby lowering the need to retrieve complete pages and decreasing the load on the Web site's content generation infrastructure. By applying the gzip-incoming tag to such content, the object is compressed, thereby allowing the edge server to make more efficient use of its cache space. Because the majority of browsers in use today support gzipped content, in most cases the gizpped file is served out to the client as is, without any need for unzipping it first. Preferably, the gzip-incoming tag is not set for content nominated for or otherwise associated with ESI processing. In such case, it is typically more efficient just to cache the content unzipped, use it as required by ESI, and then compress the result before serving".

If the content received from the origin server has a given time-to-live (TTL) associated therewith that is small enough as compared to the processing overhead (in terms of CPU cycles) involved in making the compression and storing the compressed object, it may be desirable to avoid storing the object compressed as this will consume resources in the server. This is especially true for the case where the end user is connecting to the edge server over a broadband connection. Thus, according to a feature of the invention, it may be desirable to determine whether given content fetched from the origin server should be stored in the cache in an uncompressed or compressed form by evaluating a function trading off anticipated storage time in the cache versus processing overhead required to perform the compression. This determination may be done selectively, e.g., when the object is fetched upon a cache miss and the requesting end user connects to the edge server over a high speed connection. This determination of whether to compress the object may be done as follows, although any convenient technique may be used: when the object is returned from the origin server, the software receives a response header indicating the object's size and TTL (or other cache control data). Based on the size information, the software determines the amount of processing that will be required to compress and store the object in cache given the CPU processing speed, and by examining file properties, notably file size. A decision may then be made to override a metadata tag (that would otherwise dictate storage of the object in compressed form) if storing the object in compressed form is impractical or otherwise determined to be unnecessary. This operation can be used whether or not metadata tags are used to control the compression routine. In a preferred embodiment, the metadata handling routine is configured to override the gzip-incoming metadata tag in such circumstances.

Typically, the second metadata tag is used for objects that are nominated for or are associated with ESI processing or that have no-store response headers. As noted above, the gzip-ghost-to-browser tag causes the edge server to cache content in its uncompressed form (if cacheable) and to compress (via gzip for example) the content every time a request for compressed content is received at the edge server. For cacheable content not being ESI-processed, it is preferably to use gzip-incoming for the reasons set forth above, but for no-store content, gzip-ghost-to-browser must be used to take advantage of compression.

Preferably, gzip metadata is applied only to compressible file types, i.e., those with a MIME type of text/html. Other types of content (e.g., images) are often already highly compressed and the benefit gained by gzip typically is not worth the processing cycles to do so. The gzip metadata can be applied to these files in any convenient manner, e.g., using a response-header match, or a match on file extensions known to be of text/html type, e.g., html, htm, asp, cfm, jsp, jhtml, and the like.

The application of compression must be based on information about the browser. HTTP 1.1 compliant browsers advertise support for gzipped content by including an "accept encoding: gzip" header in the requests they send. Therefore, if a browser does not advertise this support (either because it does not have it and/or does not wish to advertise it), the system must dynamically detect this (e.g., by looking at the HTTP headers) and serve an uncompressed copy of the content. Similarly, there are some browsers that do not handle gzipped content correctly even though they advertise support for with this header. If the CDN customer desires to exclude certain user-agents from being gzipped to the client, it may be desirable to nest the appropriate gzip metadata tag within a request header match and/or to have a dynamically updated set of rules regarding the support provided by various browsers. These rules may be expressed in metadata or by some other means, such as a browser lookup table, and these rules may be consulted when making decisions regarding storage and/or serving. In addition, although not required, compressed and uncompressed objects may be cached separately in the edge server cache if it is desired to apply last mile acceleration based on user-agent. This can be accomplished by generating a different cache key (which is used to control storage) for the different types of content. In an illustrative example, it is assumed that the origin server is part of the cache key. A compressed object can be stored separately by generating a cache key using an origin-server tag to override a default origin server. The value used can be a bogus host header, in which case the edge server can use a forward DNS name with a value of the real origin server set to ensure that the edge server can get the object on a cache miss.

The present invention provides many advantages. With last mile compression between the edge server and the end user, the content provider does not have compress the content before making it available to the CDN. The CDN edge servers fetch original content from the content provider's origin site the same way as in the prior art, compress the content, cache the compressed version, and serve the compressed objects, and these actions are taken in accordance with the metadata for a particular customer. Preferably, the compression metadata is enabled for compressible content such as HTMLs, javascript (.js), and stylesheets (.css), and it is disabled for images, sound and video clips, and the like, where compression does not provide performance enhancements. Compression, using the gzip algorithm for example, can reduce the size of an HTML page by a factor of anywhere from 3 to 6. A reduction by a factor of 4 means that the base page download time can be reduced by up to 75% or more depending on the size of the object and the various TCP parameters employed. Compression may additionally be applied to javascript and style sheets components of a page. Actual reduction in download time may be slightly less than 75% due to TCP's slow start algorithm. Decompression, which is a much faster process then compression, should not take a significant amount of time.

Figure 4:
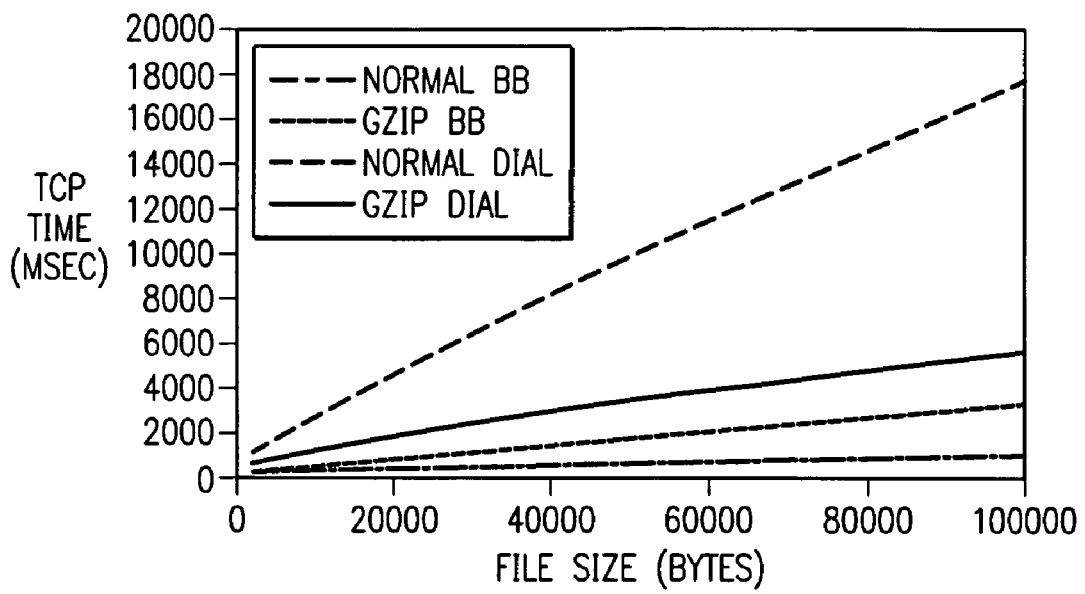
FIG. 4 is a chart illustrating expected TCP transfer times for various file sizes using normal delivery and compressed delivery assuming a 4:1 compression ratio.

FIG. 4 below shows expected TCP transfer times for various file sizes using normal delivery and compressed delivery assuming a 4:1 compression ratio. TCP transfer time includes connection set-up and request, but does not include request processing time. For broadband (BB) users, the figure shows time reductions over 1 second for 100 kB files. For dial-up users, the time reduction for 100 kB files is over 12 seconds. Clearly, any additional compression and decompression processing times of a few milliseconds is a small price to pay for a 12 second reduction in page download time. For very small files, less than 3 or 4 kB, the savings in download times are not as significant and may not warrant compressed delivery. The bulk of the transfer time for small files is due to connection set-up and TCP slow start.

The following describes when a content provider may consider using compressed delivery and when it may not want to do so. Once it is determined when and for what content compression will be used, the content provider and/or the CDNSP provisions the edge servers using metadata.

Content with long TTLs can be cached compressed. Typically, CDN edge server turnaround latency with compression is about equal to the latency for normal delivery while drastically reducing the object download time. The larger the object, the greater the impact the object has on total page time.

Figure 5:
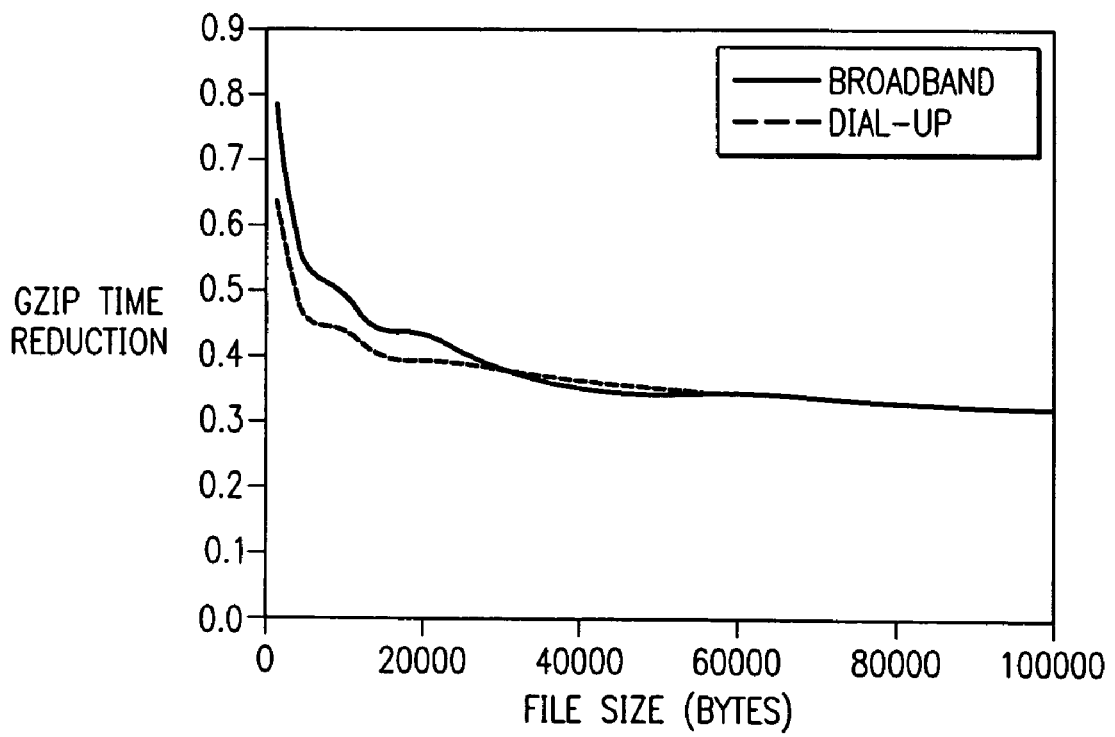
FIG. 5 is a chart illustrating compression gains versus file size for broadband and dial-up users.

Because of fixed connection set-up and request times, TCP packetization and TCP slow start, gains from compressed delivery are seen if the page sizes (uncompressed) are at least 3 kB for dial-up users and 5 kB for broadband users as shown in FIG. 5. Additionally, larger HTML objects make up a larger portion of the total page time when including embedded objects (images, graphics, and the like). The greater the portion of the total page time that compression can affect, the greater the gain. Compression only impacts the object download time but not the first byte time. The lower the user bandwidth, the longer the object download time is while the first byte time stays relatively unchanged. Situations where the page download time is significantly larger than the first byte time will yield the most improvements with compressed delivery. When pages are assembled using ESI, delivery of the first byte has to wait until all the ESI components are fetched from origin, regardless of whether compression is enabled or not. As there is now no first byte "penalty" for enabling compression, compression will largely only help to reduce total page time.

In the following situations, compression can still be enabled, but the gains may not be as great as they might be otherwise. Objects that are no-store always have to be fetched from the origin site. This has two impacts. First, the object must be compressed by the CDNSP every time, rather than cached compressed. Second, the object cannot be delivered until it has been received in its entirety from the origin site. The latter point is significant because chunked transfer encoding normally enables the CDN edge server to begin delivery after a small amount of data is received from origin. Without the ability to do chunked delivery, the first byte time will be longer with compression enabled. If the page has some of the other features conducive to compressed delivery (large HTML, mainly dial-up users, fast origin fetch), however, compression may still be advantageous. While, in most cases, compressed delivery of small files will still be faster than normal delivery, compressed delivery will not appear to be much faster unless the object is at least 4 kB. While, in most cases, compressed delivery to high BW users will still be faster than normal delivery, if the page is no-store (and non-ESI), a lower first byte time with normal delivery and chunking may make the overall page time nearly as fast or faster than with compressed delivery.

The following metadata example demonstrates the application of last mile acceleration according to the present invention to requests for the following file types: html, htm, and asp from Microsoft Internet Explorer 5 and 6 browsers on a Microsoft Windows platform. In this example, which is merely illustrative, the metadata is in the form of last mile acceleration (LMA) tags: gzip-incoming and gzip-ghost-to-browser. This metadata is supplied to the edge server via the metadata transport mechanism described above, or by any other convenient method or means. In this example, gzip is applied only to compressible content, including implicit index pages of directories and excluding javascript files. The gzip-incoming routine is used on cached content, and the gzip-ghost-to-browser is used on no-stored content. The gzip-incoming and enable-accept-chunking are not applied to the same content. In addition, gzip is applied only to requests from MSIE 5 and 6 on a Windows platform:

```xml
<?xml version="1.0"?>
    <configs>
        <akamai-config version="4.3">
            <originMap tree="1">
                <originServer value="www.origin.foo.com">
                    <hostHeader>www.foo.com</hostHeader>
                </originServer>
            </originMap>
        <tree name="1">
            <md name="serial">123</md>
            <md name="cpcode">1</md>
            <md name="max-age">2h</md>
            <match type="default-file" recursive="on">
                <match type="request-header" operation="name-value-strcasestr" argument1="user-agent" argument2="Windows">
                    <match type="request-header" operation="name-value-strcasestr" argument1="user-agent" argument2="MSIE 5">
                        <md name="forward-dns-name">www.origin.customer.com</md>
                        <md name="origin-server">gzip.origin.customer.com</md>
                        <md name="gzip-incoming">on</md>
                    </match>
                    <match type="request-header" operation="name-value-strcasestr" argument1="user-agent" argument2="MSIE 6">
                        <md name="forward-dns-name">www.origin.customer.com</md>
                        <md name="origin-server">gzip.origin.customer.com</md>
                        <md name="gzip-incoming">on</md>
                    </match>
                </match>
            </match>
            <match type="ext" value="html htm asp">
                <match type="request-header" operation="name-value-strcasestr" argument1="user-agent" argument2="Windows">
                    <match type="request-header" operation="name-value-strcasestr" argument1="user-agent" argument2="MSIE 5">
                        <md name="origin-server">gzip.origin.foo.com</md>
                        <md name="forward-dns-name">www.origin.foo.com</md>
                        <md name="gzip-incoming">on</md>
                    </match>
                    <match type="request-header" operation="name-value-strcasestr" argument1="user-agent" argument2="MSIE 6">
                        <md name="origin-server">gzip.origin.foo.com</md>
                        <md name="forward-dns-name">www.origin.foo.com</md>
                        <md name="gzip-incoming">on</md>
                    </match>
                </match>
            </match>
            <match type="filename" value="LogIn.asp">
                <md name="no-store">on</md>
                <match type="request-header" operation="name-value-strcasestr" argument1="user-agent" argument2="Windows">
                    <match type="request-header" operation="name-value-strcasestr" argument1="user-agent" argument2="MSIE 5">
                        <md name="gzip-ghost-to-browser">on</md>
                    </match>
                    <match type="request-header" operation="name-value-strcasestr" argument1="user-agent" argument2="MSIE 6">
                        <md name="gzip-ghost-to-browser">on</md>
                    </match>
                </match>
            </match>
        </tree>
    </akamai-config>
</configs>
```

While the present invention has been described using the gzip compression utility, this is not a limitation. Any convenient compression utility can be used, provided that the end user browser includes a compatible decompression routine.

Moreover, while the gzip-incoming and gzip-ghost-to-browser routines have been described as separate, this is not a limitation. The routines can be integrated into a single routine that is selectively called from either the client or forward side of the server as needed.

Although not required, preferably the CDN customer is billed for the last mile acceleration service based on the size of the uncompressed content. Thus, if the CDNSP obtains the content in an uncompressed form from the origin, a managed storage system, or the like) and compresses this content before servicing it to a requesting end user, the CDN edge server logs (and the customer is billed for) the size of the object as if it had been served without compression.

Variants

While the use of metadata tags to control the compression routine is a preferred embodiment, variations of this approach may be implemented. If there are no metadata tags, by default all content that meets a certain file type (e.g., html, htm, or the like) could be run through the compression engine. More generally, the software may be configured to automatically determine what content should be compressed by looking at file types and/or by some preprocessing to determine the compressability of the content. An example of this would be a case in which the system automatically determines that HTML pages should be compressed by either preprocessing the document and/or using a lookup table of file type extensions but not compress a given JPEG file based on the same steps. In like fashion, selective EXE files may be compressed, as another example. If desired, the software may be configured to automatically modify the operative steps (e.g., by not compressing certain files and/or file types) based on inherent information (e.g., as defined by a lookup table) that is correlated with browser information. An example of this would be a case where the system selectively does not compress certain file types for specific browsers because it knows that those browsers have bugs handling those file types.

A given compression routine may be selectively run based on a determination of the bandwidth of the end user's connection and then modifying one of the steps accordingly. Thus, for example, if the connection is high speed, it may be undesirable to compress no-store content due to the processing overhead involved in making compression. Likewise, the system may decide to uncompress an object stored compressed in cache before serving.

The decision to store an object in compressed form, or to serve an object in compressed form, as the case may be, can vary on a user request-by-user request basis.

The techniques of the present invention may be implemented in other than a content delivery network. An alternative implementation, for example, is to place the above-described functionality in a server located at or adjacent a content provider's site. The server provides caching as does a conventional Web site forward proxy. The CDN service provider or some other entity then runs the machine as a compression service on the content provider's behalf. More generally, the present invention thus includes the provision of a managed compression service wherein the service provider (such as the CDNSP) provides the mechanism (e.g., a standalone box, software, and the like) to a provisioned Web site to enable content to be stored at and/or delivered from the proxy in a compressed format.

An alternative implementation is to create a single machine CDN, e.g., by locating the server at a given datacenter at which a Web site of a content provider is hosted. Domains that will be managed by the server are CNAMEd to a CDN-specific domain so that end users get mapped to the server. The compression functionality is then implemented as has been described above.

One of ordinary skill in the art will also recognize that the present invention may also be used to facilitate delivery of compressed content between servers across a CDN. As is known, large CDNs typically include intermediate tiers between a given origin server and the edge servers. In such case, it may be desirable to implement the compression functionality in the intermediate tier or elsewhere, in which case the "client" is just one of the edge servers (as opposed to the end user's machine). More generally, the client is any other server in the CDN where the intent is to speed the transfer time of the content across the CDN for better performance or reliability for content that is not located in an edge cache.

Having described our invention, what we claim is as follows:

1. A server operative in a content delivery network that is managed by a service provider and shared by a set of participating content provider customers, wherein participating content provider customers identify content to be delivered over the content delivery network and such content has associated therewith at least one content handling requirement that is enforceable at the server, comprising:
    an XML-based structured document associated with each participating content provider customer, the XML-based structured document comprising one of: at least a first metadata tag, and a second metadata tag, wherein attributes of the first and second metadata tags are settable on a per participating content provider customer basis, and wherein each metadata tag has an associated match type condition;
    a compression utility;
    code responsive to receipt of a request for content associated with a given participating content provider customer for retrieving and parsing the XML-based structured document associated with that participating content provider customer;
    code responsive to a match on the associated match type condition in the first metadata tag for applying the compression utility to a first content type prior to caching; and
    code responsive to a match on the associated match type condition in the second metadata tag for applying the compression utility to a second content type prior to serving;
    wherein the first content type and the second content type comprise content types associated with content that a given participating content provider customer has identified to be delivered over the content delivery network.

2. The server as described in claim 1 wherein the compression utility is gzip.

3. The server as described in claim 1 wherein the first content type is content that has a given time-to-live (TTL) associated therewith that is greater than zero.

4. The server as described in claim 1 wherein the first content type is content that is unassociated with an ESI request.

5. The server as described in claim 1 wherein the second content type is content that has a given time-to-live (TTL) associated therewith that is zero.

6. The server as described in claim 1 wherein the second content type is content that is associated with an ESI request.

7. The server as described in claim 1 wherein the code is executable in a processor.

8. In a content delivery network (CDN) edge server having a processor, a cache, an HTTP server-side request handling routine and an HTTP client-side request handling routine, wherein the edge server is managed by a service provider and shared by a set of participating content provider customers, wherein participating content provider customers identify content to be delivered over the content delivery network and such content has associated therewith at least one content handling requirement that is enforceable at the edge server, the improvement comprising:
    an XML-based structured document associated with each participating content provider customer, the XML-based structured document comprising one of: at least a first metadata tag, and a second metadata tag, wherein attributes of the first and second metadata tags are settable on a per participating content provider customer basis, and wherein each metadata tag has an associated match type condition;
    code responsive to receipt of a request for content associated with a given participating content provider customer for retrieving and parsing the XML-based structured document associated with that participating content provider customer;

a first compression routine associated with the server-side request handling routine;

a second compression routine associated with the client-side request handling routine; and a metadata routine (a) responsive to a match on the associated match type condition in the first metadata tag associated with a given first type of content for applying the first compression routine to the given first type of content, and (b) responsive to a match on the associated match type condition in the second metadata tag associated with a given second type of content for applying the second compression routine to the given second type of content;

wherein the given first content type and given second content type comprise content types associated with content that a given participating content provider customer has identified to be delivered over the content delivery network.

9. In the CDN edge server as described in claim 8 wherein the given first type of content is a piece of content that is stored in the cache following compression by the first compression routine.

10. In the CDN edge server as described in claim 9 wherein the HTTP client side request handling routine retrieves the piece of content from the cache and serves the piece of content in compressed form in response to an HTTP request.

11. In the CDN edge server as described in claim 8 wherein the client side HTTP request handling routine retrieves a piece of content from the cache and serves the piece of content in response to an HTTP request following application of the second compression routine.

12. In the CDN edge server as described in claim 8 wherein the first and second compression routines are gzip.

* * * * *